J. S. PEYTON.
DESCRIPTIVE HOLDER FOR POST CARDS OR OTHER PICTURES.
APPLICATION FILED AUG. 28, 1907.
907,174.
Patented Dec. 22, 1908.
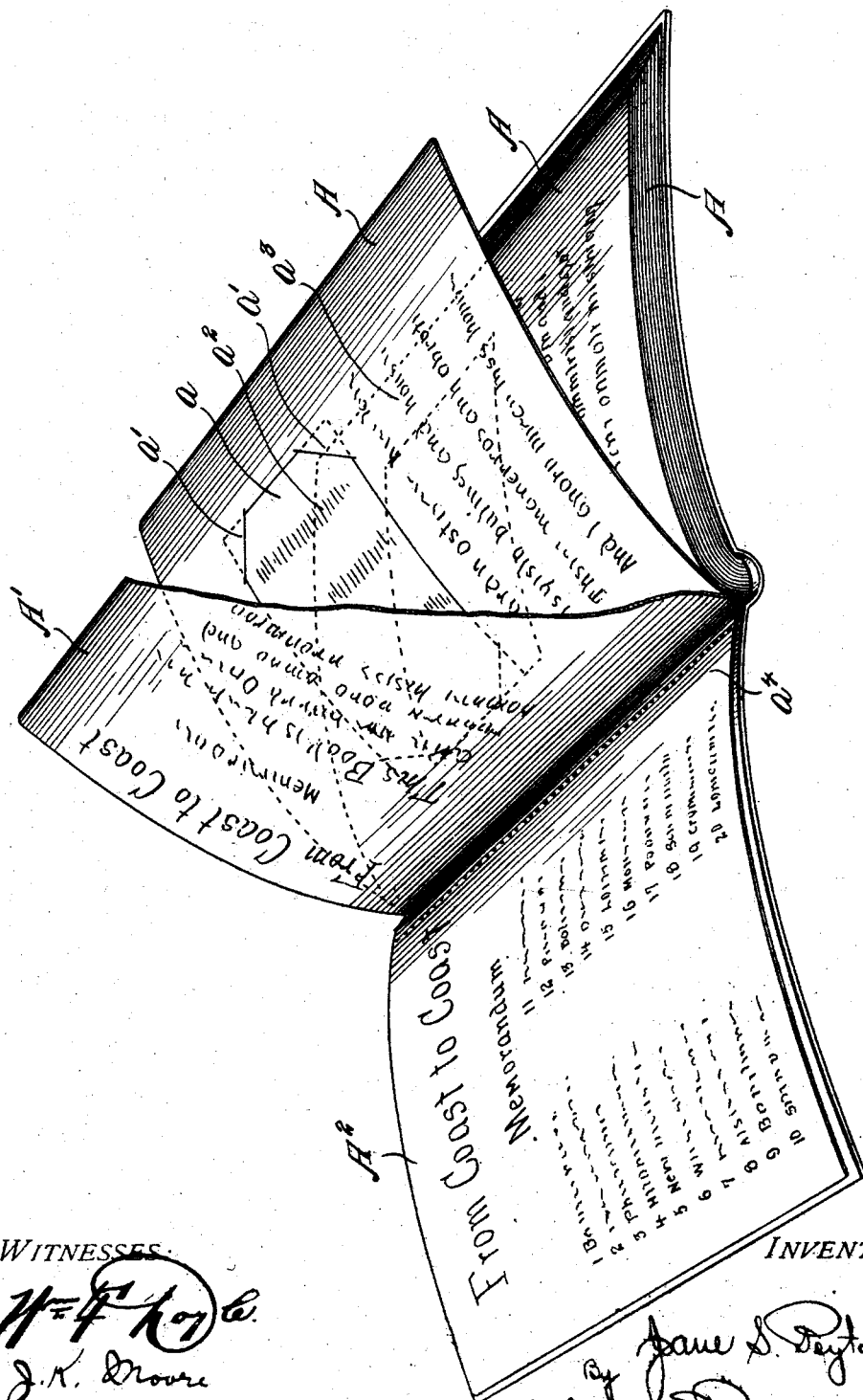

UNITED STATES PATENT OFFICE.

JANE S. PEYTON, OF WASHINGTON, DISTRICT OF COLUMBIA.

DESCRIPTIVE HOLDER FOR POST-CARDS OR OTHER PICTURES.

No. 907,174.     Specification of Letters Patent.     Patented Dec. 22, 1908.

Application filed August 28, 1907. Serial No. 390,517.

*To all whom it may concern:*

Be it known that I, JANE S. PEYTON, citizen of the United States, residing at Washington, in the District of Columbia, have invented certain new and useful Improvements in Descriptive Holders for Post-Cards or other Pictures; and I do hereby declare the following to be a full, clear, and exact description of the invention, such as will enable others skilled in the art to which it appertains to make and use the same.

My invention consists in the novel features hereinafter described reference being had to the accompanying drawing which illustrates one form in which I have contemplated embodying my invention and the invention is fully disclosed in the following description and claims.

Referring to the drawing the figure represents a perspective view of my improved device.

The object of my invention is to provide a descriptive holder for pictorial post cards, or other pictures, and it consists essentially of a plurality of previously prepared leaves arranged in a predetermined consecutive order and connected preferably by binding to form a book, each leaf being provided with an indicated space to receive a picture card or picture, and having portions of the page exterior to the said space provided with printed literary matter descriptive of the picture which is to be inserted upon the page. I also prefer to provide a detachable leaf having printed thereon a memorandum of the subjects treated upon the several pages, arranged in the order of the pages, to be removed from the book when desired, and to serve as a memorandum to a person who may be traveling, for the purchase of picture cards to be sent to the possessor of the holder itself, in order that the spaces upon the pages may be filled consecutively, or otherwise by pictures having reference to the previously prepared and printed descriptive literary matter thereon. I also prefer to provide one or more pages with printed literary matter, of a general character, descriptive of or referring to all or portions of the subjects treated upon the various picture receiving pages, to the end that when the pictures have been placed in the spaces indicated upon the various pages, the whole shall constitute a related and consecutive description, history or quasi-narrative which shall be retained as a permanent possession or souvenir.

My attention has been brought to the subject of the present invention largely by the growth of the pictorial post card industry, which now enables one to purchase in almost every portion of the world artistic and satisfactory pictures upon cards suitable for mailing, of cities, buildings, natural scenery, art reproductions, etc.

In carrying out my invention, I propose to prepare my improved descriptive holder for pictures, so that the pictures to be inserted upon the several previously prepared pages shall conform to a consecutive and orderly plan, prescribed by the descriptive literary matter, placed thereon. For example, a holder may be prepared covering a trip by railway from coast to coast, as from New York to San Francisco. Each of the previously prepared leaves will be assigned to a particular subject, for example. The Atlantic Coast, New York City, The Alleghenies, Chicago, Lake Michigan, .The Prairies, Salt Lake, The Rocky Mountains, San Francisco, The Golden Gate, the above list being merely given to illustrate an application of my invention.

Each page is provided with the indicated space to receive a picture and adjacent thereto is printed certain descriptive words of a literary character, as for example quotations from the works of great poets or prose writers, applicable to the subject to which the page is appropriated, and of a sufficiently general character to permit of the exercise of individual taste and fancy in the selection of the particular picture card or picture to be inserted in the adjacent space.

In the claims forming part of this specification I have used the expression "descriptive literary matter" in the sense indicated above, and as distinguishing the character of the printed lines or words from mere words of designation.

In the accompanying drawing I have illustrated one form of the invention in which A, A represent the series of previously prepared leaves, each having a space $a$ for the reception of the picture card or picture, and this space is preferably provided with means for attaching the card or picture, as diagonal slits $a'$ near the four corners, or by prepared gummed portions $a^2$, or both if desired, as shown in the drawing. Adjacent to the picture is printed the literary descriptive matter, indicated at $a^3$, which may be poetry or prose, according to the subjects treated.

A' represents a leaf provided with general descriptive printed matter which refers to all of the pictures with reference to their consecutive arrangement. This general descriptive leaf or leaves may be dispensed with if desired. I also prefer to provide a detachable leaf $A^2$ as indicated in the drawings, which is provided with a printed memorandum of the subjects treated on the previously prepared leaves A, A, in the same order as said leaves. This detachable leaf is preferably weakened adjacent to its inner edge, by a line of perforations $a^4$ as shown or otherwise to facilitate its removal without marring the remaining pages.

This improved holder can be used in various ways. For example a person preparing to take a certain trip may purchase a holder prepared for and covering various points of interest in the journey, and present the holder to a correspondent who is to remain at home. As the various points of interest treated in the picture receiving pages are reached, the traveler will select from the pictorial post cards on sale at that point a picture card or cards, or other pictures and mail them to his or her correspondent, to be inserted upon the previously prepared pages, thus serving not only as a form of friendly correspondence, but creating an illustrated and descriptive record of the trip, which is permanent, and of general as well as special and personal interest.

The traveler, before presenting the holder to his correspondent will detach the leaf $A^2$, and carry it with him as a memorandum, in order that the pictures selected by him may most fully harmonize with the subject matter of the literary printed matter, and to this end the said page $A^2$ may and in some cases will have printed thereon adjacent to the name of the subject, the first line of the poetical or other quotation or descriptive matter on the corresponding pages.

My invention is susceptible of wide variation and application, as to subjects and treatment, and can be made to cover subjects relating to art, history, architecture, etc., in addition to foreign and domestic travel, and when placed in the hands of the young to be filled with the pictures called for by the previously prepared pages, will have a wide and considerable educational effect, in addition to providing an amusing pastime, and creating a valuable souvenir.

It will be understood that the leaves A A and A' and $A^2$ will be connected in some suitable manner, and preferably will be bound together in the form of a book as indicated in the accompanying drawing, although I do not limit myself to this specific manner of uniting them.

What I claim and desire to secure by Letters Patent is:—

1. A holder for pictorial post cards or other pictures, comprising a plurality of previously prepared leaves secured together and forming a book or album, each leaf provided with portions arranged to receive pictorial post cards or pictures, and having printed thereon a plurality of lines of descriptive literary matter applicable to the subject matter of, and adapted to be illustrated by the post cards or pictures, which the said leaves are arranged to receive, whereby said leaves when supplied with pictures will constitute an illustrated book, substantially as described.

2. A holder for pictorial post cards or other pictures, comprising a plurality of previously prepared leaves, provided with portions arranged to receive pictorial post cards, or pictures, and having printed thereon literary matter applicable to the subject matter of the post cards or pictures which the leaves are intended to receive, and a detachable leaf having printed thereon a list of the subjects of the pictures to be inserted on the aforesaid leaves, whereby said detachable leaf may be detached and used as a guide in the selection of post cards or pictures to be inserted in the holder, substantially as described.

In testimony whereof I affix my signature, in the presence of two witnesses.

JEANNIE S. PEYTON.

Witnesses:
J. K. MOORE,
WM. F. DOYLE.